United States Patent [19]

Frizot et al.

[11] Patent Number: 4,746,486

[45] Date of Patent: May 24, 1988

[54] DEVICE FOR CHECKING CLEARANCE BETWEEN THE PERIPHERY OF THE UPPER CORE PLATE AND THE INNER SURFACE OF THE CORE ENCLOSURE OF A PRESSURIZED WATER NUCLEAR REACTOR

[75] Inventors: Alain Frizot, Montcenis; Gerard Cadaureille, Saint Bonnet de Mure; Jean-Christophe Lalere, Lyon; Jean-Yves Machuron, Le Creusot, all of France

[73] Assignee: Framatome, Courbevoie, France

[21] Appl. No.: 895,981

[22] Filed: Aug. 14, 1986

[30] Foreign Application Priority Data

Aug. 14, 1985 [FR] France .................. 85 12399

[51] Int. Cl.⁴ .............................. G21C 17/00
[52] U.S. Cl. ..................... 376/245; 376/249
[58] Field of Search ................. 376/245, 249

[56] References Cited

U.S. PATENT DOCUMENTS

| | | | |
|---|---|---|---|
| 4,196,048 | 4/1988 | Qurnell et al. | 376/245 |
| 4,217,173 | 8/1980 | Jabsen | 376/249 |
| 4,390,496 | 6/1983 | Wozniak | 376/245 |
| 4,421,715 | 12/1983 | Gunter et al. | 376/245 |
| 4,425,298 | 1/1984 | Shields | 376/249 |

FOREIGN PATENT DOCUMENTS 0063225 10/1982 European Pat. Off. .
2385185 10/1978 France .
2398583 2/1979 France .

*Primary Examiner*—Salvatore Cangialosi
*Attorney, Agent, or Firm*—Pollock, Vande Sande & Priddy

[57] ABSTRACT

Device for checking clearance between the periphery of the upper core plate and the inner surface of the core enclosure of a pressurized water nuclear reactor comprising a vertical supporting structure (7) resting on the upper plate (3), a plurality of articulated assemblies (10), each carrying a calibrated feeler blade of a specified thickness, a pivoting assembly associated with each of the articulated assemblies, for moving the blades (9) in a substantially vertical direction towards the gap between the plate (3) and the enclosure (1, 2), or in the opposite direction, as well as a video camera (14) in the vicinity of the blades (9). The device enables the checking to be carried out under water and by remote control.

4 Claims, 3 Drawing Sheets

DEVICE FOR CHECKING CLEARANCE BETWEEN THE PERIPHERY OF THE UPPER CORE PLATE AND THE INNER SURFACE OF THE CORE ENCLOSURE OF A PRESSURIZED WATER NUCLEAR REACTOR

FIELD OF THE INVENTION

The invention relates to a device for checking clearance between the periphery of the upper core plate and the inner surface of the core enclosure of a pressurized water nuclear reactor.

BACKGROUND OF THE INVENTION

In general, pressurized water nuclear reactors comprise a vessel containing the reactor core, itself supported by an assembly which also forms its screening and constitutes the lower internal equipment of the reactor. Above the core there is arranged a second assembly which forms the upper internal equipment of the reactor and which comprises the guide tubes for the reactor control rods and the upper core plate which is placed in the vessel above the fuel assemblies. The core support assembly which forms the lower internal equipment comprises the core enclosure, in the shape of a cylindrical shell with a vertical axis, and the lower core plate, fixed to the lower part of the enclosure.

The upper core plate is introduced with the upper internal equipment into the vessel, where it takes up a position inside the core enclosure. Between the periphery of this circular horizontal plate and the inner surface of the core there is a predetermined clearance which must be accurately defined and as uniform as possible around the periphery of the upper core plate. This clearance, which is small, and generally barely exceeds 1 mm in the case of a core enclosure whose internal diameter is in the range of 3.40 m, is obtained by providing, when the core enclosure is being constructed, a deposited metal layer, known as buttering, on the inner surface of the core enclosure, in the region where the upper core plate is to be placed. This buttering layer, which projects from the inner surface of the core enclosure, is machined with great care with respect to its diametral accuracy and surface quality. When the upper internal equipment is introduced into the lower internal equipment, the upper core plate may be introduced into the core enclosure without undue difficulty, since the clearance between the general part of the core enclosure and the upper core plate is considerably larger than the clearance in the region of the buttering layer.

In the case where a vessel containing new internal equipment is being outfitted, the operations of adjusting the upper internal equipment and adapting this upper internal equipment to the lower internal equipment and, in particular, checking of the clearance between the peripheral part of the upper core plate and the inner surface of the core enclosure which incorporates the buttering, require numerous checks. However, these checking operations do not present special difficulties, because it is relatively easy to gain access to the upper core plate which is in place inside the lower internal equipment, since this equipment has not been irradiated. These operations are carried out in the factory, during the final stage of manufacture of the internal equipment.

On the other hand, when a nuclear reactor has already been in operation, it may be difficult to carry out the operations of repairing, checking or changing components inside the vessel. It then becomes necessary to operate under water, with the vessel open at its top, full of water and communicating with the reactor pool which may itself also be full of water.

It has recently been proposed to carry out the complete replacement of the upper internal equipment of a pressurized water nuclear reactor, while the irradiated lower internal equipment is kept in the vessel. In fact, it may become necessary to replace the upper internal equipment if it has been subjected to wear or to distortion in use, because of the risk that proper conditions for the guidance of the control rods when the reactor is operating and for their fall in the event of an emergency shutdown can no longer be ensured.

During the operations for adapting new internal equipment to the irradiated internal equipment remaining in the vessel, it is necessary to have available a means for checking, by remote control, the clearance present between the upper core plate and the inner surface of the core enclosure, after the new upper internal equipment has been enplaced inside the lower internal equipment, in the water-filled vessel.

SUMMARY OF THE INVENTION

The aim of the invention is consequently to offer a device for checking clearance between the periphery of the upper core plate and the inner surface of the core enclosure of a pressurized water nuclear reactor, while the vessel which contains the core enclosure and the upper core plate is filled with water, by attempting to introduce feeler blades of different calibrated thicknesses into the gap which exists between the periphery of the upper core plate and the inner surface of the core enclosure and by visual observation of the possibility or impossibility of introducing each of the blades having a specified thickness, which device enables the checking to be carried out by remote control, in particular in the case where new upper internal equipment is being adapted to the irradiated lower internal equipment remaining in the vessel.

To this end, the checking device according to the invention comprises:

(a) vertical supporting structure comprising a base equipped with means for engaging and centering in the upper face of the uppr core plate, (b) a plurality of articulated assemblies forming parallelogram linkages which are substantially parallel to each other and vertical, each comprising two parallel bars articulated at one of their ends to the vertical structure, around two horizontal axes situated vertically above one another, and a vertical connecting bar articulated to the other end of the parallel bars, each of the articulated assemblies carrying a vertical calibrated feeler blade at its end close to the connecting bar, so that different calibrated feeler blades of different thicknesses are arranged following one another along the periphery of the upper core plate, (c) a pivoting assembly associated with each of the articulated assemblies, controlled from the upper part of the vertical structure, for moving the calibrated feeler blades in a substantially vertical direction either downwards and towards the gap between the upper core plate and the core enclosure, or upwards, and (d) a video camera arranged in the vicinity of the feeler blades, enabling the introduction of each of these blades in succession to be monitored by remote control.

BRIEF DESCRIPTION OF THE DRAWINGS

In order that the invention may be more clearly understood, a description will now be given, by way of example, with reference to the attached drawings, of an embodiment of a checking device according to the invention.

DESCRIPTION OF PREFERRED EMBODIMENT

Figure 1:
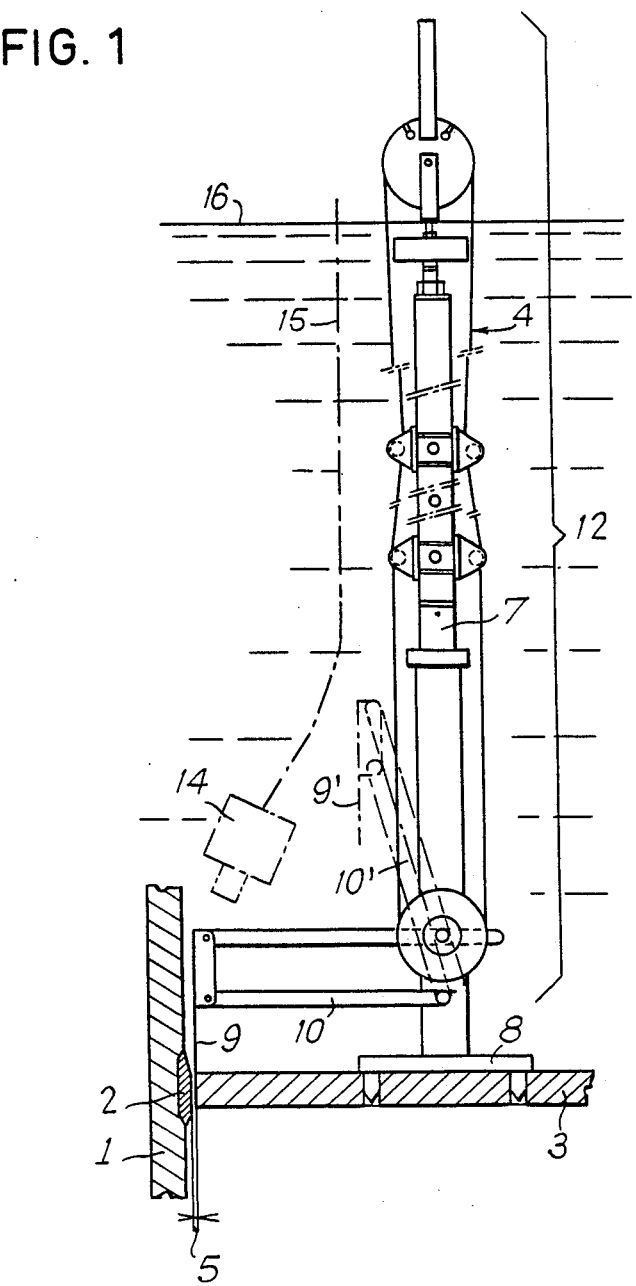
FIG. 1 is a diagrammatic view in elevation and partial cross-section of a checking device according to the invention, in working position on the upper core plate of a pressurized water nuclear reactor.

FIG. 1 shows a part of the core enclosure 1 of a pressurized water nuclear reactor, in the region of the buttering layer 2 deposited on the inner surface of this core enclosure, opposite which is placed th upper core plate 3 which forms part of the upper internal equipment, when this equipment is installed in the lower internal equipment which comprises the enclosure 1 and is kept in the vessel and under water.

Between the peripheral part of the upper core plate 3 and the buttering layer 2 there is a clearance 5, the size of which must be checked, to adjust, if necessary, the position of the upper internal equipment in the lower internal equipment.

For this purpose, use is made of at least one checking device according to the invention, such as shown in FIG. 1 and indicated generally by reference 4.

A device of this kind comprises a vertical support 7 fixed on a base 8 which rests on the upper core plate 3 when the device is in a working position, as shown in FIG. 1. The device also comprises a plurality of articulated assemblies in the form of parallelogram linkages, such as the assembly 10 which carries a calibrated feeler blade 9 at its end. Lastly, the device comprises an assembly 12, associated with each of the articulated assemblies 10, to ensure the pivoting of this articulated assembly between its position 10 and its position 10', together with a video camera 14 which transmits, by means of a cable 15, the image of the region of the peripheral gap present between the enclosure 1 and the upper core plate 3, in which the feeler blades 9 are moved by means of the device 12, which is controlled by the means 13 situated above the level 16 of the water in the reactor vessel containing the enclosure 1 and the upper core plate 3.

In order to check the clearance in various places on the periphery of the plate 3, several devices which are identical to the device 4 are placed in positions such that, by means of a movement in a virtually vertical direction, their feeler blades 9, associated with the articulated devices 10, can enter inside the gap arranged between the upper core plate 3 and the buttering layer 2 when the thickness of the feeler blade 9 is smaller than the size of the clearance. It would be possible to use a single device 4 which would be moved from one position to another on the upper core plate with equal success.

A more detailed description of the checking device 4 according to the invention will now be given with reference to FIGS. 2 to 4.

Figure 2:
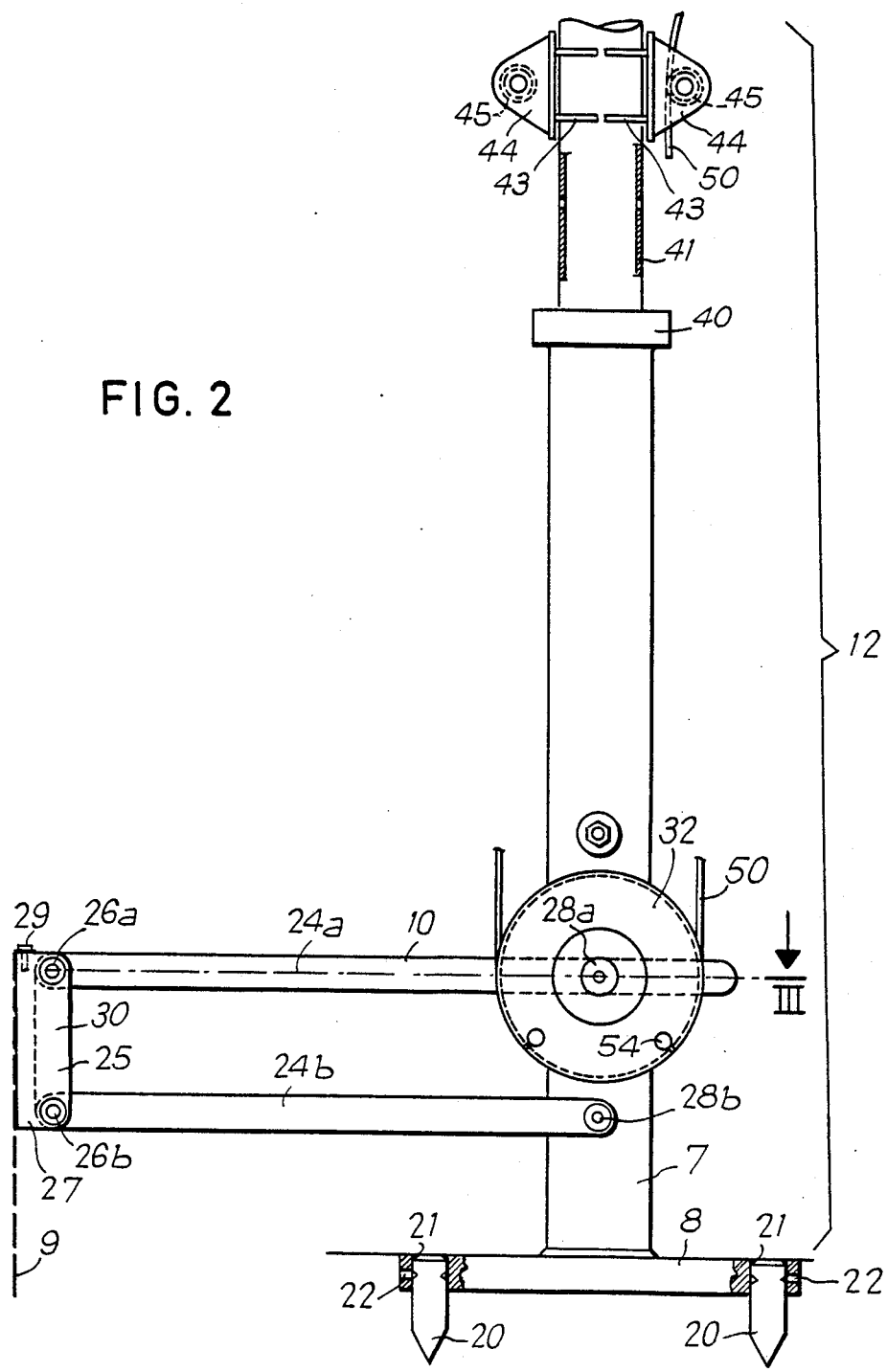
FIG. 2 is a more detailed view, in elevation, of the lower part of the device shown in FIG. 1.

FIG. 2 shows that the vertical structure 7 consists of an assembly of mechanical and welded construction, to the end of which the base 8 is fixed rigidly, by welding. This base 8 has two centering openings 21, into which centering pins 20 are introduced and are held in position by screws 22. The centering pins 20 are intended to be positioned in holes arranged in the upper core plate 3, for example in holes for centering the guide tubes of the upper internal equipment.

Figure 3:
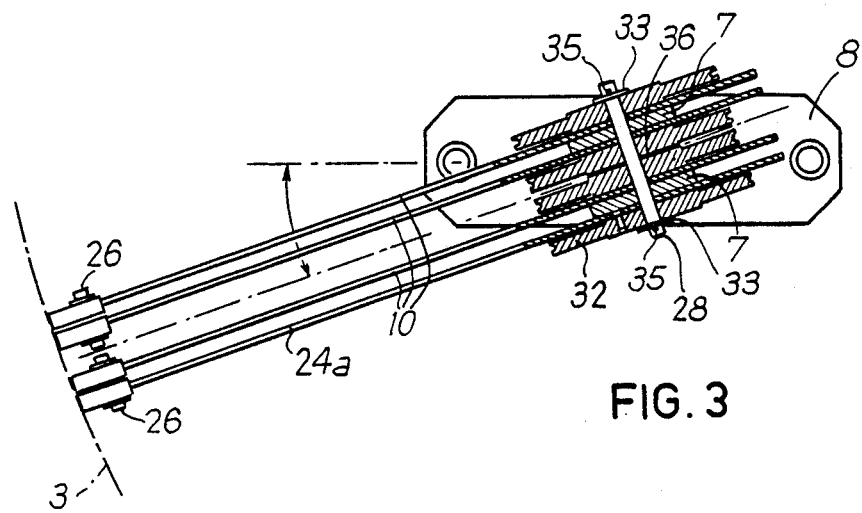
FIG. 3 is a view along III—III in FIG. 2.

As can be seen in FIG. 3, the structure 7 carries four articulated assemblies 10. Each of the articulated assemblies 10 comprises two parallel bars 24a and 24b and a connecting bar 25, connected to the ends of the parallel bars 24a and 24b by means of articulations having horizontal pins 26a and 26b, respectively. In the vicinity of their other ends, the bars 24a and 24b are connected to the structure 7, by means of two-articulations having horizontal pins 28a and 28b, placed one vertically above the other. As a result, the connecting bar 25 and the calibrated feeler blade 9 which is fixed to the end of the articulated assembly 10 always remain vertical when the bars 24a and 24b pivot around their articulations 28a and 28b.

FIG. 3 shows that the vertical structure 7 consists of two parallel uprights which are fixed slightly inclined relative to the common axis of the centering holes 21. In addition, the length of the parallel bars 24 of the articulated assemblies 10 is determined so that the end of the articulated assemblies 10 which carries the calibrated feeler blade 9 is placed slightly outside the periphery of the upper core plate 3.

The vertical connecting bar 25 of each articulated assembly 10 consists of two uprights placed on both sides of the parallel bars 24, with the hinge pins axles 26 passing through the two uprights and the bar 24 which is inserted between these two uprights with a degree of clearance, and through a member 27, fixed rigidly to the uprights to connect them together and providing support for the feeler blade 9 which is fixed to the member 27 by means of a screw 29. This ensures perfect parallelism and accurate positioning of the feeler blade 9 relative to the vertical axis 30 of the connecting bar 25 which passes through the hinge pins 26a and 26b.

At their ends remote from the connecting member 25, the upper bars 24a of each of the assemblies 10 are integrally fixed in a rigid manner to a pulley 32 whose axis of rotation coincides with the hinge pin of the corresponding bar 24a. This pin for rotation and articulation 28 is common to the bars 24a of the four assemblies 10 mounted on the support 7. The four assemblies 10 are mounted one after another on the axle 28, between two retaining washers 33 which are fixed in place by split pins 35. Mutual separation of the articulated assemblies is ensured by the vertical supporting uprights 7 and by a thin spacer 36.

In this way, the feeler blades 9 of the four assemblies, which have different thicknesses, are placed, one after another, along the periphery of the upper core plate 3 and over a length which is small relative to the total perimeter of the plate 3. To a first approximation, it may be assumed that the checking of clearance is carried out in a single region of the gap present between the periphery of the plate 3 and the core enclosure.

As can be seen in FIG. 2, the vertical structure 7 comprises a horizontal assembly plate 40 to which are welded the two vertical and parallel uprights forming the lower part of the vertical structure 7. The plate 40 also serves as a supporting base for fixing a cylindrical column 41 which forms the upper part of the vertical structure 7. This column is high enough for the upper part of the device which incorporates the control means 13 to be above the upper level 16 of the water in the reactor vessel. This column 41 also carries, by means of welded supports 43, flanges 44 which enable two sets of four guiding pulleys 45 to be mounted and placed in diametrically opposite positions relative to the column 41.

The guiding pulleys 45 enable the cables 50 for maneuvering the pulleys 32 to be held and deflected by a small distance. Each of the cables 50 for maneuvering a pulley 32 comprises two strands whose lower ends are integrally fixed to the pulley 32 by means of locking devices 54.

Figure 4:
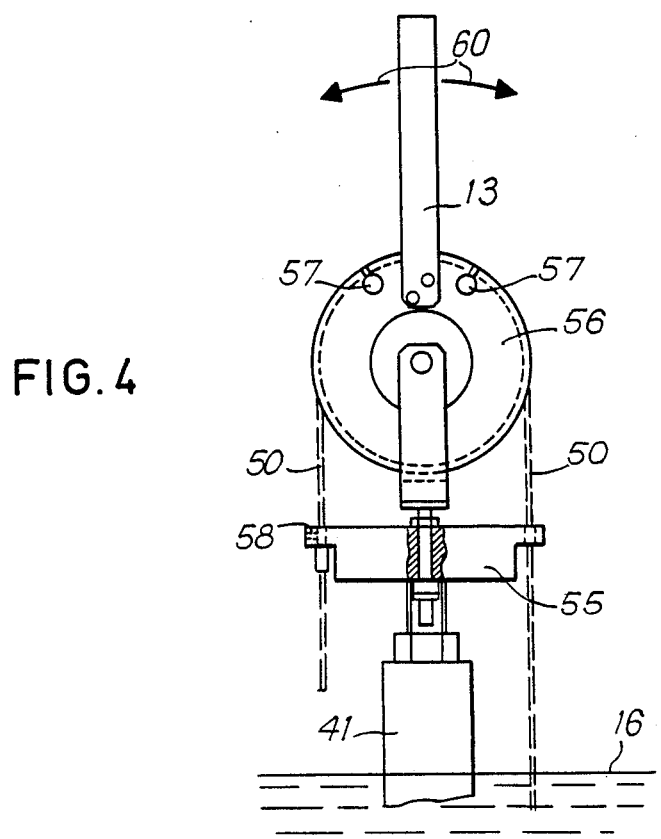
FIG. 4 is an elevation view of the upper part of the checking device shown in FIG. 1.

As can be seen in FIG. 4, the upper part of the column 41, which is situated above the level 16 of the water in the nuclear reactor vessel, carries a base plate 55, which acts as a support for a set of four upper pulleys such as 56, identical to the lower pulleys 32 of the device for pivoting the articulated assemblies 10. The upper ends of the strands of the cables 50 are fixed to the corresponding pulleys 56 by means of locking devices 57. A handle fixed rigidly to each of the pulleys 56 forms the means 13 of controlling the pivoting device. The base plate 55 also comprises a set of holes 58 which enable the strands of the cables 50 to be guided.

The four handles 13 for controlling the four pivoting devices corresponding to the four articulated assemblies 10 are arranged next to one another and are readily accessible from a location above the vessel of the nuclear reactor, for example from the footbridge associated with the device for handling the upper internal equipment. Thus, an operator can manipulate the pivoting devices in either direction (arrows 60) to produce the pivoting of the corresponding articulated assembly, by means of the cable 50 which is integrally joined to the pulleys 56 and 32, and by means of these pulleys and of the corresponding bar 24a. This pivoting causes the feeler blade 9 situated at the end of the articulated parallelogram linkage assembly 10 to move in a substantially vertical direction. This downward vertical movement of the calibrated feeler blade 9 enables the calibrated feeler blade 9 to be introduced into the gap present between the plate 3 and the buttering 2 of the enclosure 1, provided that the thickness of the calibrated feeler blade is smaller than the clearance which is present. In the case where the thickness of the calibrated feeler blade is equal to or greater than the clearance, entry is not possible and the feeler blade 9, which is flexible, bends, as shown by 9' in FIG. 1. The camera 14, connected, by means of the cable 15, to a receiver equipped with a viewing screen, enables the operator to monitor the entry or the non-entry of the calibrated feeler blade into the clearance which is present. The operator manipulates the four pivoting devices in succession, causing the movement of calibrated feeler blades having different thicknesses, proceeding in the order of either increasing or decreasing values.

The clearance can thus be determined by remote control and with a very high degree of reliability and accuracy.

The invention is not restricted to the embodiment which has been described. Thus, pivoting devices other than that described above can be imagined. Remote control of the articulated assemblies may be implemented by any mechanical, pneumatic or hydraulic means.

More than four articulated assemblies arranged side by side and each carrying a calibrated feeler blade of a different thickness can be used.

The checking device according to the invention may be applied to any operation of adapting the upper internal equipment to the lower internal equipment in a pressurized water nuclear reactor.

We claim:

1. In a pressurized water nuclear reactor comprising a vessel containing a core, a core enclosure enclosing said core, an upper core plate placed above said core inside said core enclosure with a clearance between the periphery of said upper core plate and an inner surface of said core enclosure, the improvement consisting of a device for checking said clearance in said vessel filled with water comprising
   (a) a vertical supporting structure (17) including a base (8) equipped with means (20) for engaging and centering in an upper face of said upper core plate (3);
   (b) a plurality of calibrated feeler blades (9) of different thicknesses;
   (c) means for introducing said blades into a gap present between said periphery of said upper core plate (3) and said inner surface of said core enclosure (1), said means comprising a plurality of articulated assemblies (10) in the form of parallelogram linkages which are substantially parallel to each other and vertical, each comprising two parallel bars (24a, 24b) one of whose ends is articulated to said vertical structure (7) around two horizontal hinge pins (28a, 28b) situated one vertically above the other, and a vertical connecting bar (25) articulated to the other end of said parallel bars (24a, 24b), each of said articulated assemblies (20) carrying a vertical said calibrated feeler blade (9) at its end close to said connecting bar (25), so that different calibrated feeler blades (9) having different thicknesses are arranged in sequence along the periphery of said upper core plate (3), and a pivoting assembly associated with each of said articulated assemblies (10) and controlled from the upper part of said vertical structure (7), for moving the calibrated feeler blades (9) in a substantially vertical direction, selectively either downward and towards said gap between said upper core plate (3) and said core enclosure (1), or upwards; and
   (d) visual observation means for determining the possibility of introducing each of said feeler blades (9) of a specified thickness, consisting of a video camera (14) arranged in the vicinity of said feeler blades, enabling the introduction of each of said blades (9) in succession to be monitored by remote control.

2. Checking device according to claim 1, wherein each of said pivoting assemblies comprises a lower pulley (32) fixed rigidly to one of said parallel bars (24a) and mounted for rotation about said hinge pin (28a) of said bar (24a), an upper pulley (56) integrally fixed to a handle (13) and a cable (50) comprising two strands, each fixed at one of its ends to said lower pulley (32) and at its other end to said upper pulley (56) which can be rotated in either direction by manipulating said handle (13), causing pivoting of said assembly (10) and movement of the associated said feeler blade (9) in either direction.

3. Checking device according to claim 1, wherein said vertical structure (7) carries four articulated assemblies (10) placed side by side in sequence.

4. Checking device according to claim 1, associated with at least one other identical checking device placed in a different region of said upper core plate (3) for checking clearance in another part of the periphery of said core plate (3).

* * * * *